Feb. 18, 1964     D. G. MILLHOUSE     3,121,380
COMBINED SHUTTER AND DIAPHRAGM FOR A CAMERA
Filed Dec. 19, 1960     5 Sheets-Sheet 1

INVENTOR.
Douglas G. Millhouse
BY
Robert F. Miehle
Atty.

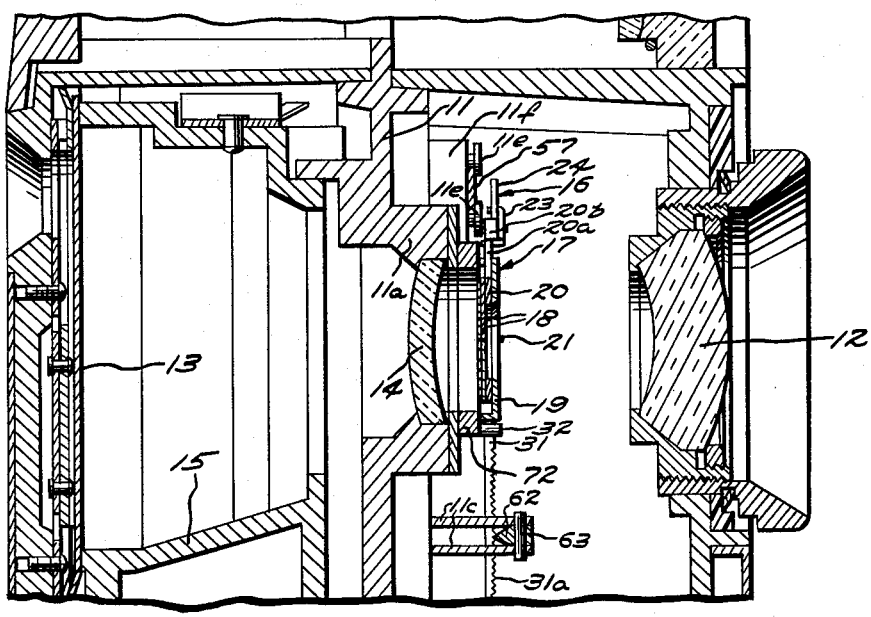

Feb. 18, 1964     D. G. MILLHOUSE     3,121,380
COMBINED SHUTTER AND DIAPHRAGM FOR A CAMERA
Filed Dec. 19, 1960     5 Sheets-Sheet 3
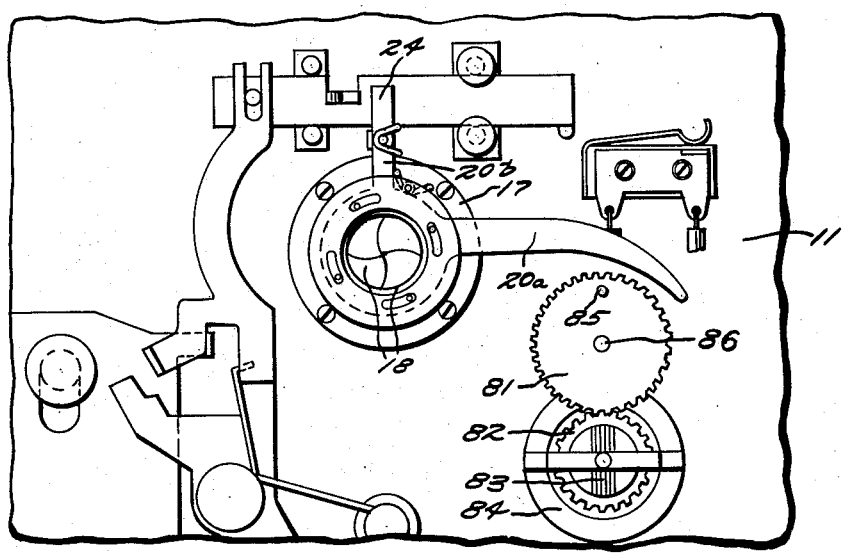
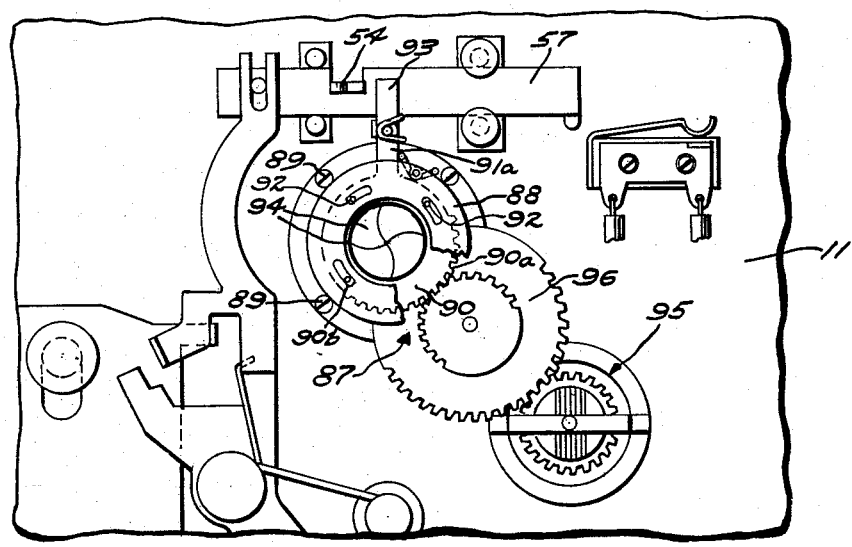
INVENTOR.
Douglas G. Millhouse
BY
Robert F. Miehle
Atty.

Feb. 18, 1964 D. G. MILLHOUSE 3,121,380
COMBINED SHUTTER AND DIAPHRAGM FOR A CAMERA
Filed Dec. 19, 1960 5 Sheets-Sheet 4

INVENTOR
Douglas G. Millhouse
BY
Robert F. Miehle Jr.
Atty.

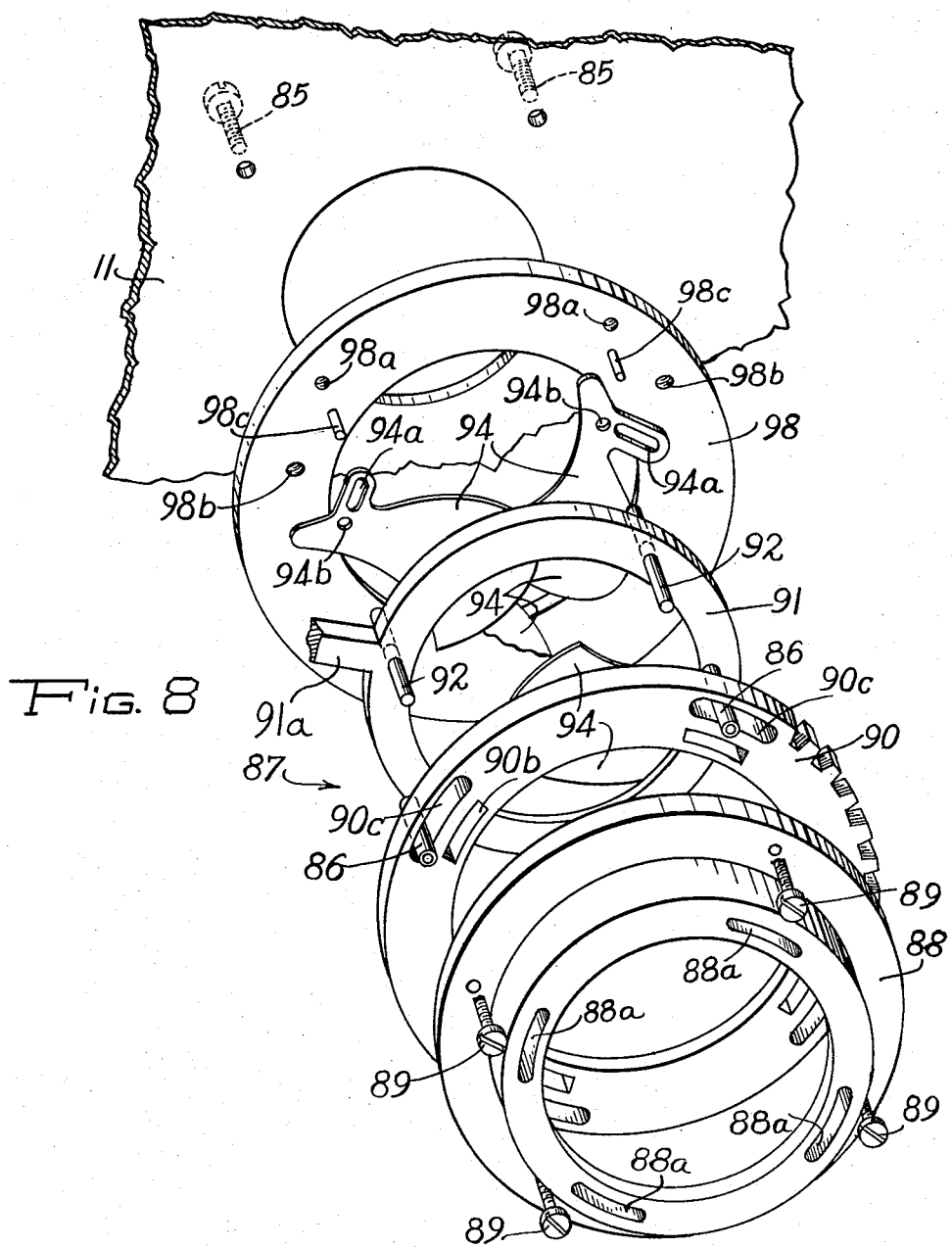

United States Patent Office 3,121,380
Patented Feb. 18, 1964

3,121,380
COMBINED SHUTTER AND DIAPHRAGM
FOR A CAMERA
Douglas G. Millhouse, Hampshire, Ill., assignor to Bell &
Howell Company, Chicago, Ill., a corporation of
Illinois
Filed Dec. 19, 1960, Ser. No. 76,574
6 Claims. (Cl. 95—64)

This invention relates to a camera, and more particularly to a combined shutter and diaphragm for a camera.

An object of the invention is to provide a single mechansim serving both as a shutter and a diaphragm in a camera.

Another object of the invention is to provide a camera having a combined shutter and diaphragm which operates to both control the time of exposure and the diameter of the light path.

Another object of the invention is to provide a camera shutter-diaphragm mechanism which, when tripped, will open to the extent permitted by a stop adjusted to provide the desired diameter of opening and then after a predetermined time recloses.

A further object of the invention is to provide an automatic exposure control in which a shutter, when tripped, is opened only to an extent permitted by a light-controlled stop device and the shutter serves both the usual shutter function and the function of a diaphragm.

Another object of the invention is to provide a shutter having a cam arm rigid on an actuating member and movable against a stop positioned by a light-controlled device to limit opening of the shutter to a predetermined diameter.

Other objects and features of the invention will be apparent from the following detailed description of a camera having a combined shutter and diaphragm mechanism forming a specific embodiment of the invention, when read in conjunction with the appended drawings, in which:

FIG. 2 is a fragmentary, vertical sectional view taken along line 2—2 of FIG. 1;

FIG. 3 is a view similar to FIG. 1 but with the parts thereof shown in different positions from those shown in FIG. 1;

FIG. 4 is a fragmentary, vertical sectional view of a combined shutter and diaphragm forming an alternate embodiment of the invention;

FIGS. 5, 6 and 7 are fragmentary, vertical sectional views of a combined shutter and diaphragm forming a further embodiment of the invention; and FIG. 8 is an exploded perspective view of the combined shutter and diaphragm of FIGS. 5 to 7.

The invention provides a camera in which a single mechanism acts both as the shutter and the iris or diaphragm. Preferably this mechanism has a plurality of blades which normally close the light path and which, when a shutter release is actuated, are opened only to an extent permitted by a light-sensitive mechanism and then reclose automatically after a predetermined period of time to provide a predetermined exposure both as to aperture and as to time. The extent of opening of the blades preferably also may be set manually as well as by the light-sensitive mechanism. The combined shutter diaphragm mechanism preferably has a resilient actuating or master control member which drives a blade opening element until the element engages a stop which is normally adjusted by the light-sensitive mechanism and then locked in adjusted position as the shutter release is actuated, and after the exposure is made, the blades are spring returned to their closed positions. In another form of the invention, the stop may be a pin mounted eccentrically on a gear driven by a light-sensitive mechanism to adjusted position in the path of the blade opening member. In a further embodiment of the invention, the iris or shutter mechanism may have a ring which limits the extent of opening of the blades, the ring being adjusted by a glavanometer controlled by light-sensitive means.

Figure 1:
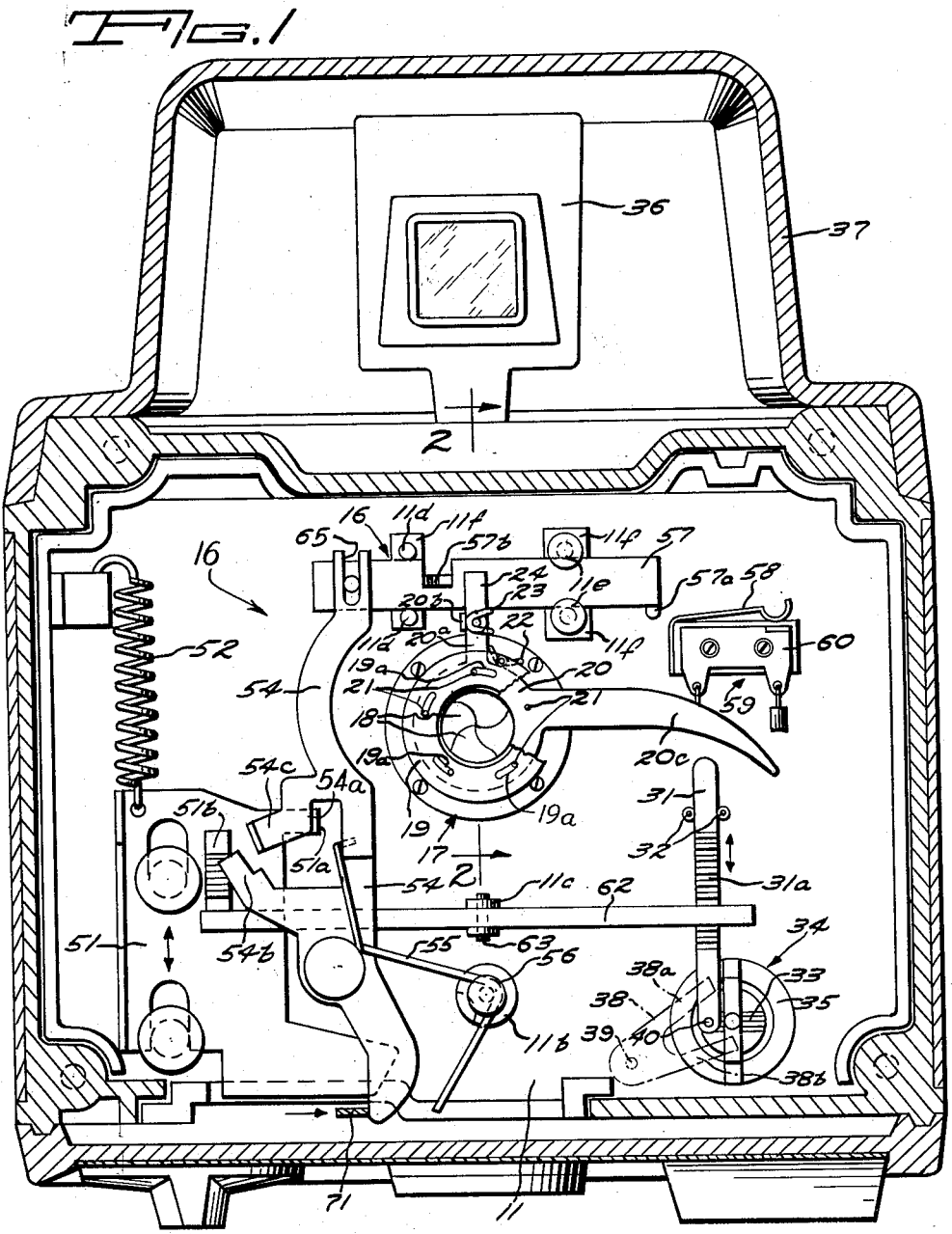
FIG. 1 is a vertical sectional view of a camera and combined shutter and diaphragm forming one embodiment of the invention.
Figure 6:
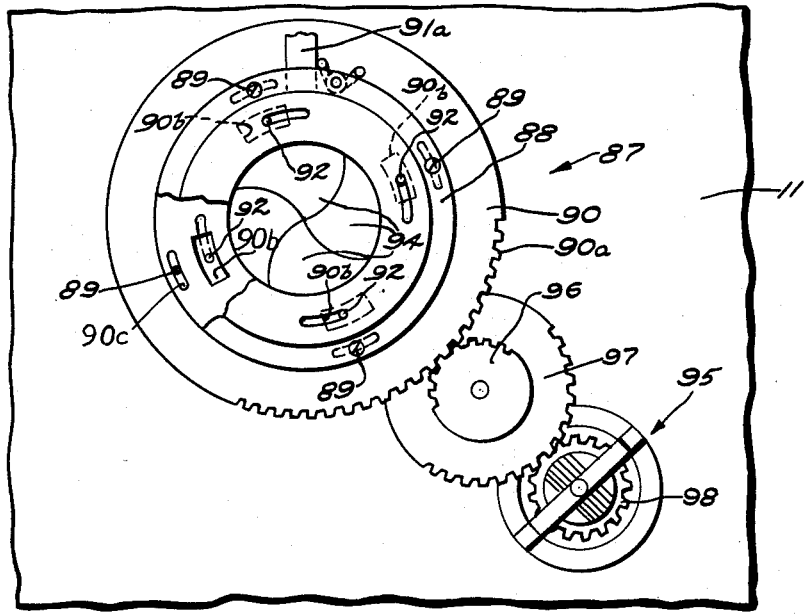
Figure 7:
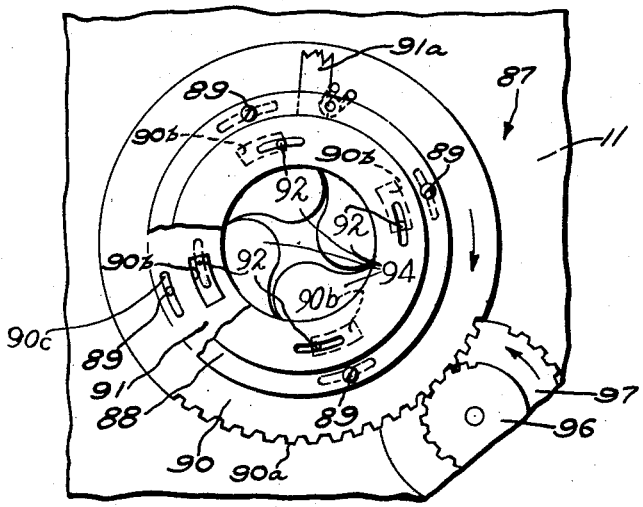

Referring now in detail to the drawings, there is shown in FIGS. 1 to 3 a camera having a vertical wall or mechanism plate 11 positioned between a front lens component 12 and a film 13 to be exposed, a rear lens component 14 being mounted on a tubular lens holder 11a formed integrally with the wall 11 and forming an objective with the component 12. The film is positioned at the focal plane of the objective at the rear of a known tapered light-tight tube 15 to which the tubular portion 11a fits in light-tight relationship.

An automatic exposure device 16 is provided with a combined shutter and an iris mechanism 17 is mounted on the plate 11 in front of the lens 14 to close off the light path completely except during exposure of the film. The mechanism 17 is somewhat similar to the well known iris type of diaphragm and includes blades 18 pivotally mounted on pins in annular, flanged housing 19 for gradual movement by a rotatable ring 20 by means of known pin and slot connections between their closed positions, through intermediate open positions as shown in FIG. 3 to fully open positions. The ring 20 has pins 21 thereon movable along slots 19a in the housing 19. A spring 22 bearing against rigid arm 20a of the ring and against the housing 19 urges the ring counterclockwise, as viewed in FIG. 1, toward its position holding the blades 18 closed and limited by the pins 21 engaging the ends of the slots 19a. A spring 23 urges an arm 24, which is pivotally mounted on the arm 20a, counterclockwise against a stop lug 20b with a force much greater than the force of the spring 22 so that the arm 24 may be pushed in a clockwise direction to move the ring 20 against the action of the spring 22 without moving the arm 24 away from the stop lug 20b. However, when the ring 20 is positively held against clockwise rotation, the arm 24 may be pivoted clockwise away from the stop lug against the action of the spring 23.

Mounted in the path of cam-shaped arm 20c of the actuating ring 20 is slidable arm or stop 31 slidably mounted on the plate 11 by headed guide pins 32. The arm 31 is connected eccentrically to a coil 33 of a galvanometer 34 having a stator 35 fixed to the plate 11. The coil 33 is spring biased in a counter-clockwise direction, as viewed in FIG. 1, and its rotary position is determined by the intensity of light from a scene to be photographed falling on a photo-electric cell 36 in viewfinder 37 of the camera, the cell 36 controlling current to the coil 33 in a manner well known in the photographic art. The coil 33 is adjusted against the galvanometer spring clockwise from its furthermost counter-clockwise position by current therethrough in accordance with the intensity of light on the cell 36, the coil having a turning range of about 105°, the position of the coil 33 in FIG. 1 being roughly midway between its extremes of movement. A manual override mechanism 38 for manual adjustment of the arm 31 is provided. The mechanism 38 is in the form of a fork pivotally mounted in the camera by a manually rotatable shaft movable by a user of the camera to move one of arms 38a and 38b into engagement with pin 40 to move the stop 31 to a selected position and hold it there. Normally the user sets the mechanism 38 in the position shown in FIG. 1 in which the arms 38a and 38b are outside the range of movement of the pin 40. The adjusted position of the stop 31, whether set automatically or manually determines the extent that the combined shutter diaphragm mechanism 17 may be opened for an exposure.

To trigger an exposure, a manually depressible release button (not shown) may be actuated to move a trigger plate 51 downwardly against spring 52 to move lug 51a out of the path of shoulder 54a of driving lever 54. A spring 55 adjustably secured to boss 11b of the wall 11 by screw 56 then swings the lever 54 clockwise to drive a master control member 57 to the right to cause a cam 57a to engage and spring contact 58 of a flash initiating switch 59 against contact 60 to start ignition of a flash bulb (not shown). An escapement type pawl or lug 57b then strikes arm 24 and swings the ring 20 clockwise until cam arm 20c engages the stop 31, and the combined shutter and iris is thus opened to the extent permitted by the stop 31 which has been latched or trapped in the proper position by a clamping lever 62 pivotal on pin 63 supported by bracket 11c on the wall 11. This trapping of the stop 31 is effected by a wedging cam 51b of the trigger plate 51 before the release of the lever 54 by the plate 51, the lever having a serrated end portion engaging a similarly serrated portion 31a of the stop 31 and clamping the stop 31 against the wall 11. The cam 51b also has a dwell portion for holding the lever 62 in clamping position during further downward movement of the trigger plate 51. The lever 62 is spring urged toward a normal, non-clamping position.

After the arm 20c engages the stop 31, the shutter-diaphragm 17 opens no further, and the cam 57b turns the arm 24 against spring 23 and travels on out of engagement with arm 24, the spring 22 then quickly returns the ring 20 to its normal position, the ring 20 closing the shutter-diaphragm blades 18. The opening and closing actions of the shutter-diaphragm mechanism 17 are effected very rapidly, and the essence of the timing of the exposure is controlled by the length of engagement of the cam 57b and arm 24. The bar 57 is mounted slidably on the wall 11 by pins 11d and 11e, and a pin and slot drive connection 65 is provided between the lever 54 and bar 57.

After the master control bar or member 57 has moved out of engagement with the arm 24, the bar 57 continues to be driven to the right, as viewed in FIG. 1, until notched arm 54b engages lug 51a which stops the lever 54, the notched arm 54b preventing another triggering movement of the trigger plate 51 until after the film has been wound to position an unexposed film for the next exposure. A known winding device moves recocking arm 71 back and forth during transport of the film, and the arm 71 engages the lever 54 and swings it counter-clockwise until camming portion 54c snaps over the lug 51a to relatch the lever 54. Recocking of the lever 54 also moves the master control bar 57 back to its cocked position, the pawl type cam 57b springing past the arm 24 without swinging the arm 24. To permit such springing, the bar 57 is flexible and is spaced somewhat from the wall 11 to provide clearance as illustrated best in FIG. 2, projections 11f being provided to guide the bar 57. The shutter-diaphragm mechanism 17 is mounted on the wall 11 with a spacer 72 between the mechanism 17 and the tube 11a to space the mechanism 17 at a precise point along the light path for diaphragm purposes and for shutter purposes as well.

The automatic exposure control shown in FIG. 4 is generally like that shown in FIGS. 1 to 3, but instead of the stop 31 has a gear 81 driven to adjusted position by gear 82 driven by coil 83 of galvanometer 84. The gear 81 carries a stop pin 85 positioned in the path of cam arm 20a of the combined shutter-diaphragm mechanism 17. The gear 81 is mounted on a shaft 86 journalled in the mounting plate 11, and, if desired, a detented manually override shaft may be selectively brought into engagement with shaft for manually setting the gear 81. The pin 85 is positioned generally in alignment with the shaft 86 and the meshing portions of the gears 81 and 82 and the movement of the portion of the arm 20a engaging the pin is substantially along this line so that a clamping mechanism corresponding to the lever 62 may be omitted, if desired.

In the embodiment of the invention shown in FIGS. 5 to 8, which is generally similar to the above described embodiments, a combined shutter-diaphragm mechanism 87 is mounted rotatably in housing member 88 and is secured by screws 85 to the mounting plate 11. A stop ring 90 provided with a gear segment 90a is rotatably mounted by arcuate slots 90c mounting the ring rotatably on spacers 86 mounted on screws 89. An actuating ring 91 identical with the ring 20 and having pins 92 is movable from its normal or blade-closing position by the master control bar 57 through arm 93 corresponding to arm 24 and arm 91a rigid with the ring 91. Movement of the ring 91 from its blade-closing position opens iris blades 94 until the pins 92 engage the ends of slots 90b in the stop ring 90 after which the arm 93 pivots on the arm 91a. The rotative position of the stop ring 90 is controlled by light-controlled galvanometer 95 which drives keyed reducing gears 96 and 97 meshing with the gear segment 90a and gear 98 of the meter, respectively. Adjustment of the stop ring 90 changes the rotative positions of the slots 90b to adjust the extent that the blades 94 may be opened thereby controlling the shutter-diaphragm opening, the duration of the shutter opening being controlled by the master control bar 57. If desired, a suitable manual override mechanism may be provided to turn the galvanometer coil, the gears 96 and 97 or the stop ring 90 and hold the latter in adjusted position for manual exposure control. Also, the shutter release mechanism may have a bar detent, or similar device, for clamping the stop ring in adjusted position just prior to triggering the shutter. The pins 92 project through arcuate slots 88a to mount the stop ring rotatably on the housing member 88, which is secured rigidly to mounting ring 98 by the screws 89 which are threaded into tapped bores 98a. The ring 98 also has tapped bores 98b into which the screws 85 are threaded to mount the ring 98 rigidly on the mounting plate 11. The iris blades 94 are of known construction and have slots 94a mounting the blades pivotally on pins 98c on the mounting ring. The pins 92 project through and beyond the back face of the ring 91 into holes 94b in the blades, and when the ring 91 is turned, the pins 92 turn the blades 94.

In the above described cameras, a single mechanism serves both as the shutter and as the diaphragm, thereby eliminating the other mechanism, and do so with either automatic control of the aperture or manual control thereof. The shutter speed or exposure time may be regulated by adjustment of the spring force on the driving lever and master control bar.

While the invention is thus described, it is not wished to be limited to the precise details described, as changes may be readily made without departing from the spirit of the invention.

What is claimed is:

1. In a camera having a predetermined light path, a plurality of iris blades in the path, an actuating ring for opening and closing the blades, first spring means of a predetermined strength biasing the ring toward a position closing the blades, an arm movably mounted on the ring, second spring means biasing the arm toward a predetermined position relative to the ring with a force opposite to that of the first spring means such that the arm is held in said predetermined position until the ring is positively stopped when the arm is pressed in a direction moving the ring in a blade opening direction, triggerable means for engaging the arm and moving it in a direction moving the ring in a blade opening direction, an adjustable stop, the ring being provided with means for moving into engagement with the stop when moved in a blade-opening direction, galvanometer means for adjusting the stop, light-sensitive means for controlling the galvanometer means, manually operable means for actuating the triggerable means, and means operable by the manually operable means before actuation of the triggerable means for clamping the stop against movement.

2. In a camera having a predetermined light path, a plurality of blades, a housing mounting the blades pivotally in the light path, an actuating ring having a drive arm and a stop arm, pin-and-slot coupling means between the actuating ring and the blades for opening the blades when the ring is turned in one direction and closing the blades when the ring is turned in the opposite direction, stop means including a bar adjustably positioned in the path of the stop arm as the ring is turned in a blade-opening direction, a galvanometer for adjusting the bar, drive means for resiliently driving the drive arm in a blade-opening direction until the stop arm engages the stop means and then holding the ring in that position for a predetermined period of time and then releasing the drive arm, means for moving the ring in a blade-closing direction after the drive arm is released by the drive means and manually operable means for sequentially clamping the bar and actuating the drive means.

3. In a camera having a predetermined light path, a plurality of blades, a housing mounting the blades in the light path for movement, a stop ring for stopping movement of the blades at points between the closed and fully open positions thereof, and having a geared periphery and being rotatable in the housing, an actuating ring mounted rotatably in the housing for moving the blades between open and closed positions, stop means on the actuating ring and the stop ring for limiting movement of the actuating ring in the blade-opening direction, a gear train for adjusting the stop ring, means for driving the actuating ring in a blade-opening direction until the actuating ring is stopped by the stop ring and then releasing the actuating ring after a predetermined period of time in which the blades are open, and means for returning the actuating ring to a position closing the blades after the release of the actuating ring by the driving means.

4. In a combined shutter-diaphragm device for a camera, a ring-shaped blade control means surrounding a plurality of blades means and adapted to move said blade means between a closed condition and a fully opened condition, reciprocable actuating means movable through a predetermined path for actuating the blade control means and moving the blade means from the closed condition to the fully opened condition thereof, resilient driving means for driving the actuating means for a predetermined period of time, means for urging the blade control means toward a closed condition for reclosing the blade means after the blade control means has been actuated for a set period of time, adjustable stop means for stopping movement of the blade control means by the driving means to open said blade means to any desired position, said reciprocable blade control means including a pivoted arm portion mounted so as to normally move with the blade control means and adapted to yield under force applied by said actuating means after the movement of the blade control means is stopped by said adjustable stop means.

5. The combined shutter-diaphragm of claim 4 wherein the adjustable stop means includes a stop and light-sensitive means for adjusting the stop.

6. In a camera having a predetermined light path, a plurality of blades, a housing mounting the blades pivotally in the light path, an actuating ring having a drive arm and a stop arm, pin-and-slot coupling means between the actuating ring and the blades for opening the blades when the ring is turned in one direction and closing the blades when the ring is turned in the opposite direction, stop means including a galvanometer having a movable coil and a first gear movable therewith, light-sensitive means for regulating the galvanometer, a second gear driven by the first gear and having a stop pin in the path of the stop arm as the ring is turned in a blade-opening direction, drive means for resiliently driving the drive arm in a blade-opening direction until the stop arm engages the stop means and then holding the ring in that position for a predetermined period of time and then releasing the drive arm, and means for moving the ring in a blade-closing direction after the drive arm is released by the drive means.

References Cited in the file of this patent
UNITED STATES PATENTS

| | | |
|---|---|---|
| 761,756 | Brueck | June 7, 1904 |
| 2,969,004 | Gebele | Jan. 24, 1961 |
| 2,981,164 | Durst | Apr. 25, 1961 |
| 2,984,165 | Erlichman | May 16, 1961 |